US009272277B2

(12) United States Patent
Peltola et al.

(10) Patent No.: US 9,272,277 B2
(45) Date of Patent: Mar. 1, 2016

(54) CAPILLARY GROOVE FOR ISOBARIC WASTE ENTRY

(71) Applicant: Honeywell International Inc., Morristown, NJ (US)

(72) Inventors: Eric Richard Peltola, Minneapolis, MN (US); Ronald Bardell, St. Louis Park, MN (US); Mark Washa, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 13/768,320

(22) Filed: Feb. 15, 2013

(65) Prior Publication Data

US 2014/0230579 A1 Aug. 21, 2014

(51) Int. Cl.
*G01L 3/00* (2006.01)
*B01L 3/00* (2006.01)

(52) U.S. Cl.
CPC ........... *B01L 3/502* (2013.01); *B01L 3/502723* (2013.01); *B01L 3/502746* (2013.01); *B01L 2200/0684* (2013.01); *B01L 2300/087* (2013.01); *B01L 2300/0816* (2013.01); *B01L 2300/0874* (2013.01); *B01L 2400/0406* (2013.01); *Y10T 29/49* (2015.01)

(58) Field of Classification Search
CPC ...... G01N 1/00; G01N 1/28; B01L 2200/141; B01L 2300/0829; B01L 3/00
USPC ....................................................... 73/864.91
See application file for complete search history.

(56) References Cited

U.S. PATENT DOCUMENTS

2001/0033380 A1* 10/2001 Colon ................ G01N 15/1404 356/436
2003/0021727 A1* 1/2003 Weyker ................ A61B 10/007 422/412
2003/0152994 A1* 8/2003 Woudenberg ....... B01L 3/50273 435/6.12
2004/0052684 A1* 3/2004 Sinsky .................. B01L 3/5085 422/400
2007/0025875 A1* 2/2007 Peters ............... B01L 3/502723 422/400
2007/0092402 A1* 4/2007 Wu ......................... B01L 3/502 422/400
2009/0181411 A1 7/2009 Battrell et al.

(Continued)

FOREIGN PATENT DOCUMENTS

WO WO-2006/115663 A2 11/2006
WO WO-2008/014050 A2 1/2008

OTHER PUBLICATIONS

"European Application Serial No. 14152749.9, European Search Report mailed May 21, 2014", 3 pgs.
"European Application Serial No. 14152749.9, Office Action mailed Jun. 23, 2014", 10 pgs.

(Continued)

*Primary Examiner* — Peter Macchiarolo
*Assistant Examiner* — Mohammed Keramet-Amitcolai
(74) *Attorney, Agent, or Firm* — Schwegman Lundberg & Woessner, P.A.

(57) ABSTRACT

A multiple layer cytometric test card includes a waste channel to receive biological waste from an area of the test card utilized for testing biological samples, a first waste storage compartment in a waste layer of the card having a top and a bottom in relation to an operating vertical orientation of the test card, and a capillary positioned along a vertical length of the first waste storage compartment, the capillary being open to the waste compartment along the vertical length of the waste compartment, wherein the waste channel is coupled to the capillary channel proximate the top of the waste storage compartment.

20 Claims, 2 Drawing Sheets

(56) References Cited

U.S. PATENT DOCUMENTS

| | | | |
|---|---|---|---|
| 2009/0215125 A1 | 8/2009 | Reed et al. | |
| 2009/0232709 A1* | 9/2009 | Richard .................. | B01L 3/502 422/400 |
| 2010/0140110 A1* | 6/2010 | Kim .................. | B01L 3/502761 205/775 |

OTHER PUBLICATIONS

"European Application Serial No. 14152749.9, Response filed Jan. 5, 2015 to Office Action mailed Jun. 23, 2014", 12 pgs.

"European Application Serial No. 14152749.9, Examination Notification Art. 94(3) mailed May 6, 2015", 6 pgs.

* cited by examiner

CAPILLARY GROOVE FOR ISOBARIC WASTE ENTRY

BACKGROUND

Detection of biological samples results in biological waste being generated. There are significant safety issues involved in properly handling and disposing of biological waste. When using disposable cards to distribute and test the waste, the cards should control the waste well enough that instruments that come in contact with the card are not contaminated. Waste chambers have been used to help control the waste.

SUMMARY

A multiple layer cytometric test card includes a waste channel to receive biological waste from an area of the test card utilized for testing biological samples, a first waste storage compartment in a waste layer of the card having a top and a bottom in relation to an operating vertical orientation of the test card, and a capillary positioned along a vertical length of the first waste storage compartment, the capillary being open to the waste compartment along the vertical length of the waste compartment, wherein the waste channel is coupled to the capillary channel proximate the top of the waste storage compartment.

A method including receiving waste liquid at a capillary coupled along and open to a length of a waste compartment in a multiple layer cytometric test card, drawing the waste liquid into the capillary via capillary action, transporting the waste via the capillary toward a bottom of the waste compartment, and exiting the waste from the capillary into the waste compartment when surface tension of the waste liquid in the capillary is overcome.

A method including forming a waste chamber in a layer of a multiple layer cytometric test card for insertion into a test instrument in a predetermined orientation, forming a groove proximate the waste chamber creating a capillary that is open to the waste chamber along a length of the waste chamber, and forming a waste channel to couple to the groove and the waste chamber to provide liquid waste that enters the capillary via capillary action and travels in the capillary down the length of the waste chamber, entering the waste chamber when surface tension is overcome.

DETAILED DESCRIPTION

Figure 1:
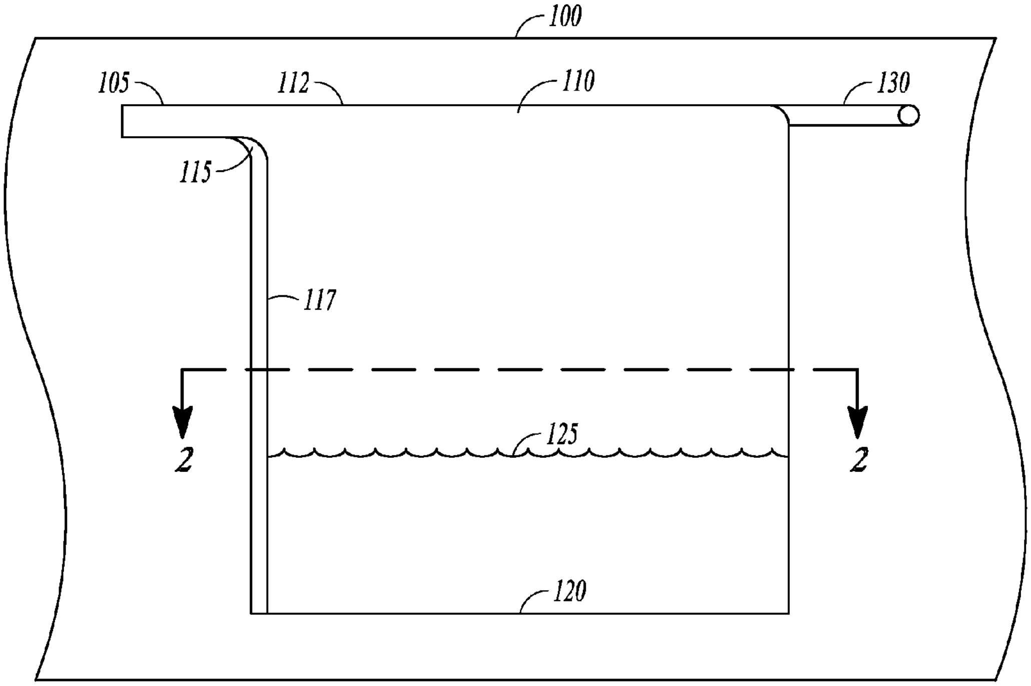
FIG. 1 is a block diagram planar representation of a testing card having on board waste storage according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Waste storage in a multiple layer cytometric test card can create a backpressure that may interfere with fluid flow upstream of a waste storage chamber. Given a vertical insertion of the card into a test instrument, the waste fluid will settle to the bottom of the waste storage chamber. As waste fluid builds up, the pressure at the bottom of the liquid increases while the pressure at the top stays the same. With prior card designs, waste enters only through the bottom of the waste chamber, resulting in upstream fluid encountering increasing pressure in increasing time as the waste chamber. Flow cytometric measurements may be adversely affected by an increasing backpressure in increasing time. In various embodiments, cytometry is the process of measuring various parameters associated with cells, such as size.

In various embodiments of a new design, waste encounters a waste compartment from the top of the waste compartment, and enters the waste compartment at the top surface of the filling waste liquid, resulting in no change in back pressure as a function of time.

A narrow groove, referred to as a capillary sits along the side of the new waste tank. As the waste encounters the waste compartment, the waste is moved into the capillary via capillary action. The capillary is open to the waste compartment along the length of the waste compartment and is held in the narrow groove by surface tension. Once the surface tension is overcome, either by encountering the bottom of an empty waste compartment or encountering a surface of waste already in the waste compartment, the waste enters the waste compartment. The point at which the waste enters the waste compartment moves up as the waste compartment is filled.

As indicated above, the groove is open to the waste tank. The fluid flows along this groove because of capillary action and is kept in the groove due to surface tension. Very little energy is used to cause the fluid to follow that path, resulting in minimal and unchanging backpressure as the waste compartment fills. If the groove was not present, waste entering the waste compartment from a top waste channel would result in a variable back pressure due to the waste repeatedly overcoming surface tension to intermittently drip into the waste compartment.

Once waste starts to build up along the bottom of the tank, the path of least resistance (as seen by the entering waste fluid) is out onto the surface of the filling waste liquid. This path of least resistance will provide the same negligible backpressure throughout the run.

Figure 2:
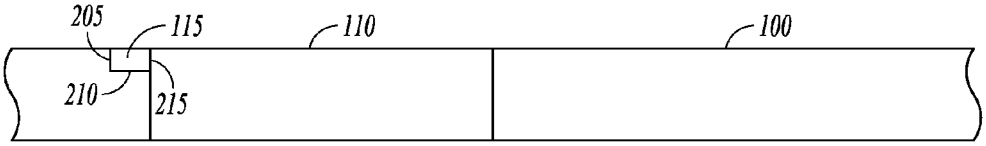
FIG. 2 is a cross section representation of the testing card of FIG. 1 taken along lines 2-2 according to an example embodiment.

FIG. 1 is a block diagram planar view of a multiple layer test card 100. FIG. 2 is a block diagram cross section of the test card 100 of FIG. 1 taken along line 2-2. In some embodiments, the test card 100 contains many layers of a transparent material such as PET or other acrylic or suitable material that can be patterned with various liquid fluid transport features. The card 100 in some embodiments may be used to perform one or more blood tests utilizing a small volume of blood. The blood or other liquid to be tested, may be transported via one or more layers of the test card, and prepared for analysis by a test instrument into which the card is inserted. Various sensors, such as a combination of light emitting diodes, lasers, and photoreceptors may be used to test the liquid.

After the liquid has been tested, a waste channel 105 receives the waste liquid and transports it to a first waste chamber or compartment 110. The waste channel 105 and waste chamber 110 may be formed in separate layers in some embodiments. In one embodiment, the card 100 is designed to be inserted into the test instrument such that liquid from waste channel 105 enters into a top 112 of the chamber 110.

A narrow groove 115 forms a capillary that the waste liquid enters due to capillary action. The groove 115 in one embodiment extends along a length 117 of the waste chamber 110 to a bottom 120 of the waste chamber, where the liquid overcomes surface tension holding the liquid in the groove 115 when the waste chamber is empty. As the waste chamber 115 fills, as indicated at 125, the waste in the groove 115 enters the waste chamber at the liquid level 125, as the surface tension is overcome by encountering the liquid at the level 125. Air is displaced in the waste chamber 110 and is removed via an air channel 130 where it may be discharged to ambient.

In FIG. 2, the groove 115 is shown in cross section and includes a depth 205 and width 210. In one embodiment, the groove is formed in the same layer as the waste chamber 110. While the waste chamber 110 is cut all the way through the layer and later encased by adjacent layers, the groove may be cut by laser, such as a CO2 laser in a controlled manner to only remove a small portion of the layer. The groove is also encapsulated by at least one adjacent layer. In once embodiment, the depth 205 of the groove 115 is approximately 0.125 mm. This depth is sufficient to result in both the capillary action to draw waste liquid into the groove, and is also sufficient to ensure that surface tension of the liquid, indicated at 215 maintains the waste liquid in the groove until the surface tension is overcome by encountering waste liquid already in the waste chamber or encountering the bottom 120 of the waste chamber 115.

Figure 3:
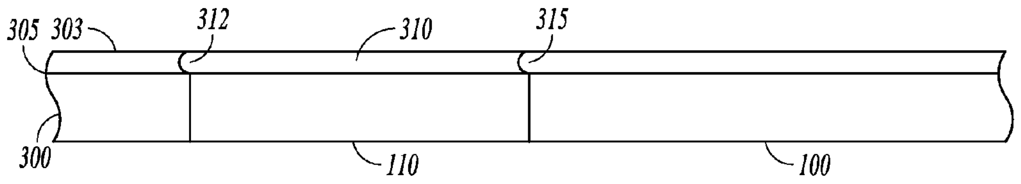
FIG. 3 is an alternative cross section representation of the testing card of FIG. 1 taken along lines 2-2 according to an example embodiment.

In FIG. 3, the test card 100 includes a layer 300 that includes the waste chamber 110. Test card 100 also includes a second layer 303, coupled to the layer 100 such as via an adhesive layer 305. The second layer 303 includes a cut out portion 310 that helps form a groove 312 that provides the capillary to transport waste into the waste chamber 110. The cut out portion 310 may extend in the second layer 303 toward the other end of the chamber 110 such as shown at 315. In further embodiments, the cut out portion 310 only extends part way toward the end of the chamber 110 to preserve the structural integrity of the second layer In some embodiments, one or more registration features may be used to ensure the card is properly oriented within the test instrument such that the bottom of the chamber 120 is properly oriented to receive waste liquid from the groove.

In various embodiments, there are multiple layers in one embodiment of the card 100. A layer 210 serves as a cap and also contains the vent passage 150. Layer 212 contains the chambers 110 115, and 120. A layer 213 contains the passes that communicate liquid and air between the chambers and also serves as a cap for one or more other layers 215, 220, 225, and 230 that are transporting and processing the liquid that becomes waste. The number of layers in the card 100 may vary in different embodiments. The vent passage 150 in one embodiment passes air to ambient via layer 230. In further embodiments, vent passage 150 may take an alternate route to pass air to ambient.

Figure 4:
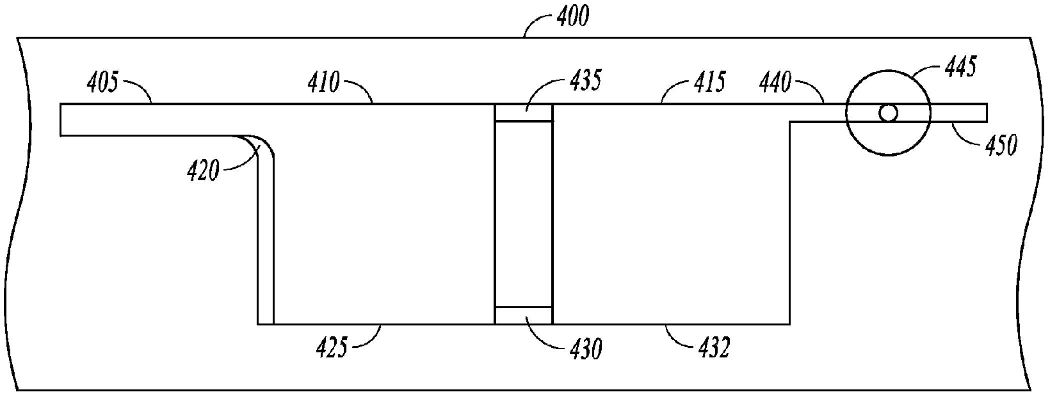
FIG. 4 is a block diagram planar representation of an alternative multiple layer testing card having on board waste storage according to an example embodiment.

FIG. 4 illustrates a card 400 having multiple waste chambers. Card 400 includes a waste channel 405 that opens into a first waste chamber 410 that is coupled to a second waste chamber 415. Waste from waste channel 405 is transported by a capillary 420 extending along the length of waste chamber 410 and filling the waste chamber from a bottom 425 of waste chamber 410. A channel 430 couples the first waste chamber 410 to the second waste chamber 415 along the bottoms 425, 432 of both waste chambers. An air pass 435 couples the top portions of the two waste chamber 410 and 415 to transfer air displaced by fluid filling the first chamber 410. A second air pass 440 extends from the top of the second waste chamber 415 to discharge the displaced air from both chambers to ambient. An air permeable membrane 445 may be positioned between the air pass 440 and a pass 450 to ambient, which is formed in a separate layer with the membrane 445 positioned between the two layers to prevent waste liquid from exiting the card 400.

EXAMPLES

1. A multiple layer cytometric test card comprising:

a waste channel to receive biological waste from an area of the test card utilized for testing biological samples;

a waste storage compartment in a waste layer of the card having a top and a bottom in relation to an operating vertical orientation of the test card; and a capillary positioned along a vertical length of the waste storage compartment, the capillary being open to the waste compartment along the vertical length of the waste compartment, wherein the waste channel is coupled to the capillary channel proximate the top of the waste storage compartment.

2. The multiple layer cytometric test card of example 1 wherein the capillary is sized such that surface tension on fluid in the capillary maintains the fluid in the capillary until the fluid encounters fluid within or the bottom of the waste storage compartment.

3. The multiple layer cytometric test card of example 2 wherein the capillary is sized such that capillary action transfers fluid from the waste channel to the capillary.

4. The multiple layer cytometric test card of any of examples 1-3 wherein the capillary is approximately 0.125 mm in thickness and wherein the waste compartment is greater than 0.5 mm in thickness.

5. The multiple layer cytometric test card of any of examples 1-4 and further comprising a vent coupled to the waste compartment to reduce backpressure otherwise resulting from filling the waste compartment.

6. The multiple layer cytometric test card of any of examples 1-5 wherein the capillary is positioned and sized to minimize changes in back pressure while the waste compartment is filling.

7. The multiple layer cytometric test card of any of examples 1-6 wherein the capillary is formed on a same layer as the waste compartment.

8. The multiple layer cytometric test card of any of examples 1-7 wherein the capillary is formed on a capillary layer adjacent a layer containing the waste compartment, wherein the capillary layer is adapted to cap the waste compartment.

9. The multiple layer cytometric test card of example 8 wherein the capillary layer and layer containing the waste compartment are coupled via an adhesive layer.

10. A method comprising:

receiving waste liquid at a capillary coupled along and open to a length of a waste compartment in a multiple layer cytometric test card;

drawing the waste liquid into the capillary via capillary action;

transporting the waste via the capillary toward a bottom of the waste compartment;

exiting the waste from the capillary into the waste compartment when surface tension of the waste liquid in the capillary is overcome.

11. The method of example 10 and further comprising exhausting air from the waste storage compartment to ambient outside the card.

12. The method of example 11 wherein the air is exhausted through a gas permeable, liquid impermeable membrane separating the compartment from ambient.

13. The method of any of examples 10-12 wherein the waste liquid is passed sequentially through multiple adjacent waste chambers.

14. The method of any of examples 10-13 wherein air is passed from a top of one waste chamber to the top of an adjacent waste chamber.

15. The method of example 14and further comprising using an orientation feature on the card to ensure the card is inserted correctly into the test fixture such that gravity causes the waste liquid to flow into the waste chamber in a selected manner.

16. The method of any of examples 10-15 wherein air passes out of a compartment via a pass to a downstream compartment as the compartment is filled with biological waste.

17. A method comprising;

forming a waste chamber in a layer of a multiple layer cytometric test card for insertion into a test instrument in a predetermined orientation;

forming a groove proximate the waste chamber creating a capillary that is open to the waste chamber along a length of the waste chamber; and forming a waste channel to couple to the groove and the waste chamber to provide liquid waste that enters the capillary via capillary action and travels in the capillary down the length of the waste chamber, entering the waste chamber when surface tension is overcome.

18. The method of example 17 and further comprising exhausting air from the waste chamber to ambient outside the card.

19. The method of example 18 wherein the air is exhausted through a gas permeable, liquid impermeable membrane separating the waste chamber from ambient.

20. The method of any of examples 17-19 and further comprising using an orientation feature on the card to ensure the card is inserted correctly into the test fixture such that gravity causes the waste liquid to flow into the waste chamber in a selected manner.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A multiple layer cytometric test card comprising:

a waste channel to receive biological waste from an area of the test card utilized for testing biological samples;

a waste storage compartment in a waste layer of the card having a top and a bottom in relation to an operating vertical orientation of the test card; and a capillary positioned along a vertical length of the waste storage compartment, the capillary being open to the waste compartment along the vertical length of the waste compartment, wherein the waste channel is coupled to the capillary channel proximate the top of the waste storage compartment.

2. The multiple layer cytometric test card of claim 1 wherein the capillary is sized such that surface tension on fluid in the capillary maintains the fluid in the capillary until the fluid encounters fluid within or the bottom of the waste storage compartment.

3. The multiple layer cytometric test card of claim 2 wherein the capillary is sized such that capillary action transfers fluid from the waste channel to the capillary.

4. The multiple layer cytometric test card of claim 1 wherein the capillary is approximately 0.125 mm in thickness and wherein the waste compartment is greater than 0.5 mm in thickness.

5. The multiple layer cytometric test card of claim 1 and further comprising a vent coupled to the waste compartment to reduce backpressure otherwise resulting from filling the waste compartment.

6. The multiple layer cytometric test card of claim 1 wherein the capillary is positioned and sized to minimize changes in back pressure while the waste compartment is filling.

7. The multiple layer cytometric test card of claim 1 wherein the capillary is formed on a same layer as the waste compartment.

8. The multiple layer cytometric test card of claim 1 wherein the capillary is formed on a capillary layer adjacent a layer containing the waste compartment, wherein the capillary layer is adapted to cap the waste compartment.

9. The multiple layer cytometric test card of claim 8 wherein the capillary layer and layer containing the waste compartment are coupled via an adhesive layer.

10. A method comprising:

receiving waste liquid at a capillary coupled along and open to a length of a waste compartment in a multiple layer cytometric test card;

drawing the waste liquid into the capillary via capillary action;

transporting the waste via the capillary toward a bottom of the waste compartment;

exiting the waste from the capillary into the waste compartment when surface tension of the waste liquid in the capillary is overcome.

11. The method of claim 10 and further comprising exhausting air from the waste storage compartment to ambient outside the card.

12. The method of claim 11 wherein the air is exhausted through a gas permeable, liquid impermeable membrane separating the compartment from ambient.

13. The method of claim 10 wherein the waste liquid is passed sequentially through multiple adjacent waste chambers.

14. The method of claim 10 wherein air is passed from a top of one waste chamber to the top of an adjacent waste chamber.

15. The method of claim 14 and further comprising using an orientation feature on the card to ensure the card is inserted correctly into the test fixture such that gravity causes the waste liquid to flow into the waste chamber in a selected manner.

16. The method of claim 10 wherein air passes out of a compartment via a pass to a downstream compartment as the compartment is filled with biological waste.

17. A method comprising;

forming a waste chamber in a layer of a multiple layer cytometric test card for insertion into a test instrument in a predetermined orientation;

forming a groove proximate the waste chamber creating a capillary that is open to the waste chamber along a length of the waste chamber; and forming a waste channel to couple to the groove and the waste chamber to provide liquid waste that enters the capillary via capillary action and travels in the capillary down the length of the waste chamber, entering the waste chamber when surface tension is overcome.

18. The method of claim 17 and further comprising exhausting air from the waste chamber to ambient outside the card.

19. The method of claim 18 wherein the air is exhausted through a gas permeable, liquid impermeable membrane separating the waste chamber from ambient.

20. The method of claim 17 and further comprising using an orientation feature on the card to ensure the card is inserted correctly into the test fixture such that gravity causes the waste liquid to flow into the waste chamber in a selected manner.

* * * * *